United States Patent
Fujii et al.

(10) Patent No.: US 8,758,464 B2
(45) Date of Patent: Jun. 24, 2014

(54) EXHAUST TREATMENT DEVICE FOR A DIESEL ENGINE

(75) Inventors: Yasuo Fujii, Sakai (JP); Masanori Fujiwara, Sakai (JP); Katsushi Inoue, Sakai (JP); Yuuki Ishii, Sakai (JP); Kenta Mitamura, Sakai (JP); Noriyoshi Eguchi, Sakai (JP); Yongchol Lee, Sakai (JP); Tomohiro Ninomiya, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 13/583,244

(22) PCT Filed: Mar. 16, 2011

(86) PCT No.: PCT/JP2011/056178
§ 371 (c)(1), (2), (4) Date: Sep. 7, 2012

(87) PCT Pub. No.: WO2011/118464
PCT Pub. Date: Sep. 29, 2011

(65) Prior Publication Data
US 2013/0042584 A1 Feb. 21, 2013

(30) Foreign Application Priority Data
Mar. 24, 2010 (JP) .................... 2010-067837
Jun. 18, 2010 (JP) .................... 2010-138933

(51) Int. Cl.
*B01D 39/14* (2006.01)
*B01D 39/06* (2006.01)
*B01D 24/00* (2006.01)
*B01D 50/00* (2006.01)
*B01D 39/20* (2006.01)

(52) U.S. Cl.
USPC ............. 55/282.3; 55/522; 55/523; 55/524; 422/169; 422/170; 422/171; 422/172; 422/177; 422/178; 422/179; 422/180; 422/181; 422/182

(58) Field of Classification Search
USPC ............. 55/522–524, 282.3; 60/297; 422/169–172, 177–182
See application file for complete search history.

(56) References Cited

U.S. PATENT DOCUMENTS

| 8,424,290 B2 * | 4/2013 | Tan et al. .............. 60/285 |
| 2003/0230078 A1 * | 12/2003 | Yahata et al. ........... 60/295 |

(Continued)

FOREIGN PATENT DOCUMENTS

| JP | 05-187221 A | 7/1993 |
| JP | 2005-155444 A | 6/2005 |

(Continued)

OTHER PUBLICATIONS

Int'l Search Report issued May 31, 2011 in Int'l Application No. PCT/JP2011/056178.

(Continued)

*Primary Examiner* — Amber Orlando
(74) *Attorney, Agent, or Firm* — Panitch Schwarze Belisario & Nadel LLP

(57) ABSTRACT

The disclosed exhaust treatment device for a diesel engine can prevent heat damage to a DPF when regenerating said DPF. If a selection device (7), which selects whether to allow or prohibit an automatic DPF regeneration process, is set to prohibit the automatic DPF regeneration process, a DPF regeneration control device (4) is made able to start a process to cancel execution of the automatic DPF regeneration process. If the selection device (7) is set to allow the automatic DPF regeneration process, the DPF regeneration control device (4) retracts the cancellation of the automatic DPF regeneration process, allowing execution of the previously-cancelled automatic DPF regeneration process to begin.

8 Claims, 4 Drawing Sheets

(56) References Cited

U.S. PATENT DOCUMENTS

| | | | |
|---|---|---|---|
| 2004/0226287 A1* | 11/2004 | Edgar et al. | 60/295 |
| 2005/0126162 A1* | 6/2005 | Otake et al. | 60/297 |
| 2005/0188681 A1* | 9/2005 | Emi et al. | 60/277 |
| 2005/0217253 A1* | 10/2005 | Onodera et al. | 60/295 |
| 2008/0034738 A1* | 2/2008 | Singh et al. | 60/295 |
| 2008/0202096 A1* | 8/2008 | Driscoll et al. | 60/274 |
| 2010/0043403 A1* | 2/2010 | Minamikawa et al. | 60/285 |

FOREIGN PATENT DOCUMENTS

| | | |
|---|---|---|
| JP | 2008-215218 A | 9/2008 |
| JP | 2011-007105 A | 1/2011 |

OTHER PUBLICATIONS

Office Action issued May 14, 2013 in JP Application No. 2012-506959.

* cited by examiner

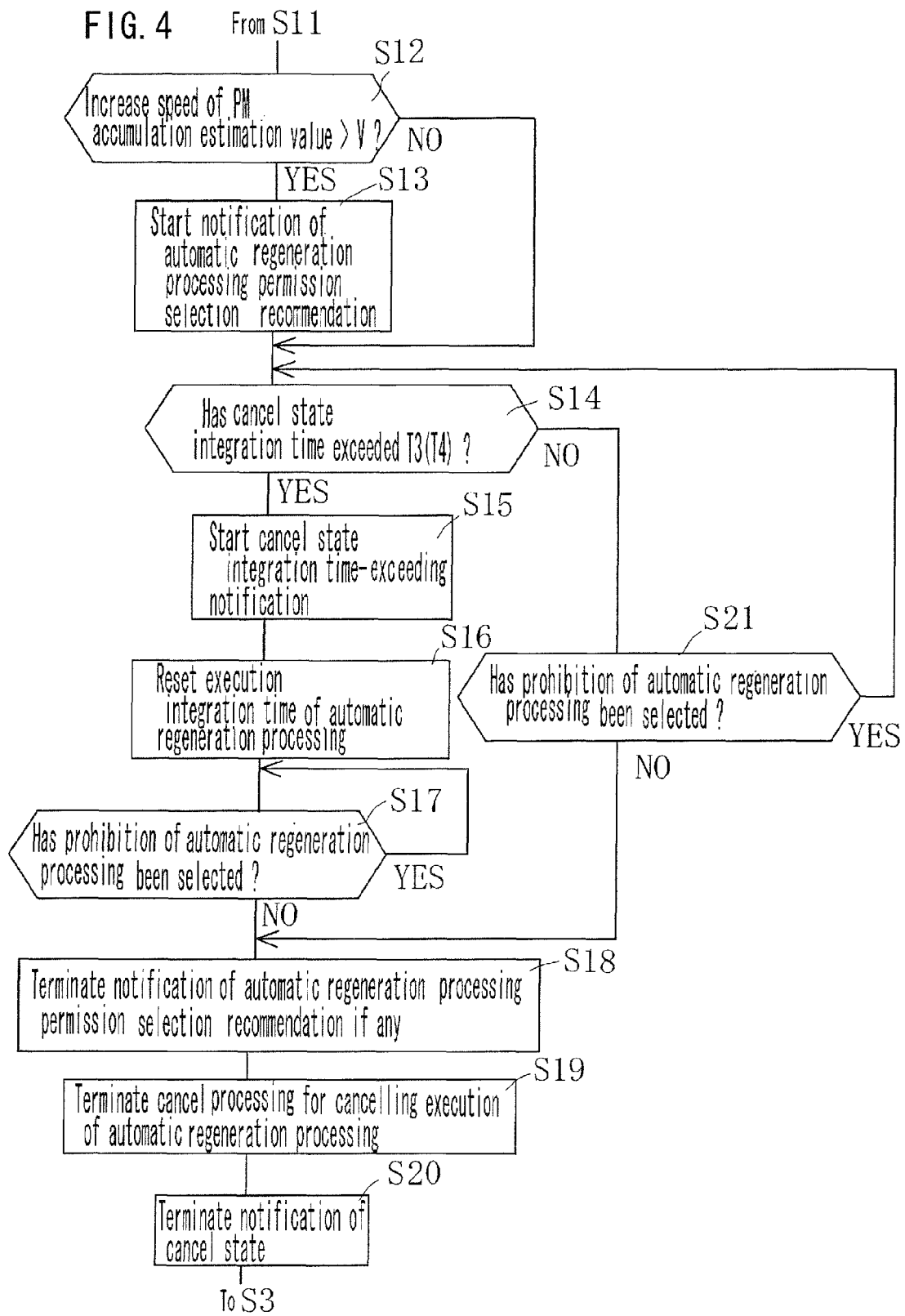

EXHAUST TREATMENT DEVICE FOR A DIESEL ENGINE

CROSS-REFERENCE TO RELATED APPLICATION

This application is a Section 371 of International Application No. PCT/JP2011/056178, filed Mar. 16, 2011, which was published in the Japanese language on Sep. 29, 2011, under International Publication No. WO 2011/118464 A1, and the disclosure of which is incorporated herein by reference.

TECHNICAL FIELD

The present invention relates to an exhaust treatment device for a diesel engine and, more particularly, to an exhaust treatment device for a diesel engine which is capable of preventing thermal damage to a DPF when regenerating the DPF.

From among terms in the present invention, a DPF is an abbreviation of a Diesel Particulate Filter, a PM is an abbreviation of Particulate Material included in an exhaust gas, and a DOC is an abbreviation of a diesel oxidation catalyst.

BACKGROUND ART

Conventionally, a DPF regeneration control device starts the execution of automatic DPF regeneration processing based on the fact that the accumulation estimation value of PM accumulated on a DPF has reached the start value of the automatic DPF regeneration processing so that the temperature of an exhaust gas passing through the DPF is raised by an automatic DPF regeneration device and the PM accumulated on the DPF is incinerated and removed by the heat of the exhaust gas. Furthermore, the DPF regeneration control device starts cancel processing for canceling the execution of the automatic DPF regeneration processing based on the prohibition manipulation of the automatic DPF regeneration processing although the DPF satisfies a condition that the automatic DPF regeneration processing is executed.

In accordance with this type of an exhaust treatment device, there are advantages in that the DPF may be repeatedly used by the automatic DPF regeneration processing and the automatic DPF regeneration processing may be cancelled by the cancel manipulation of a regeneration cancel manipulation device under the condition that it is not appropriate to execute the automatic DPF regeneration processing.

However, the prior art is problematic in that the cancel state of the automatic DPF regeneration processing cannot be freely released.

PRIOR ART DOCUMENT

Patent Document

Patent Document 1: Japanese Unexamined Patent Publication No. 5-187221 (refer to FIGS. 1 and 2)

SUMMARY OF THE INVENTION

Problems to be Resolved by the Invention

<Problem> The DPF may be thermally damaged when the DPF is regenerated.

A cancel period becomes long because the cancel state of the automatic DPF regeneration processing cannot be freely released, and the DPF may be thermally damaged because PM excessively accumulated during cancel is combusted rapidly and strongly when the DPF is regenerated and thus the DPF is overheated.

An object of the present invention is to provide an exhaust treatment device for a diesel engine which is capable of preventing a DPF from being thermally damaged when regenerating the DPF.

Means of Solving the Problems

A specific matter of an invention relating to claim 1 is as follows.

As shown in FIG. 1, in an exhaust treatment device for a diesel engine, in which a DPF regeneration control device 4 starts (S3) the execution of automatic DPF regeneration processing based on the fact that an estimation value of PM accumulated on a DPF 1 has reached the start value J3 of the automatic DPF regeneration processing so that an automatic DPF regeneration device 3 raises temperature of an exhaust gas 11 passing through the DPF 1 and thus the PM gathered at the DPF 1 is incinerated and removed by heat of the exhaust gas 11, and the DPF regeneration control device 4 starts (S10) cancel processing for canceling the execution of the automatic DPF regeneration processing based on a manipulation of prohibition of the automatic DPF regeneration processing although the DPF 1 satisfies a condition that the automatic DPF regeneration processing is executed, an automatic DPF regeneration processing permission or prohibition selection device 7 is installed as shown in FIG. 1, when the prohibition of the automatic DPF regeneration processing is selected through the automatic DPF regeneration processing permission or prohibition selection device 7 as shown in FIG. 2, the DPF regeneration control device 4 starts (S10) the cancel processing for canceling the execution of the automatic DPF regeneration processing, and when the permission of the automatic DPF regeneration processing is selected through the automatic DPF regeneration processing permission or prohibition selection device 7 as shown in FIG. 2, the DPF regeneration control device 4 releases the cancel state of the automatic DPF regeneration processing so that the execution of the automatic DPF regeneration processing that was cancelled is started (S3).

Advantageous Effects of the Invention (An Invention Relating to Claim 1)

The invention relating to claim 1 has the following effect.

<Effect> Thermal damage to a DPF can be prevented when regenerating the DPF.

As shown in FIG. 2, when the permission of the automatic DPF regeneration processing is selected by the automatic DPF regeneration processing permission or prohibition selection device 7, the DPF regeneration control device 4 releases the cancel state of the automatic DPF regeneration processing so that the execution of the automatic DPF regeneration processing that was canceled is started (S3) in order to prevent the cancel period from becoming long. Accordingly, thermal damage to the DPF 1 when regenerating the DPF can be prevented because such a problem that PM excessively accumulated during the cancel period is combusted rapidly and strongly when regenerating the DPF is prevented.

(An Invention Relating to Claim 2)

The invention relating to claim 2 has the following effect in addition to the effect of the invention relating to claim 1.

<Effect> Thermal damage to a DPF can be prevented when regenerating the DPF.

When the cancel state integration time of the automatic DPF regeneration processing exceeds a cancel state permission integration time T3 as shown in FIG. 2, the DPF regeneration control device 4 starts (S15) cancel state permission integration time-exceeding notification through the cancel state permission integration time-exceeding notification device 41. Accordingly, the accumulation of PM can be rapidly informed before the PM is excessively accumulated on the DPF 1 due to the accumulation of a cancel state, and it is possible to prevent the PM from being excessively accumulated on the DPF 1 because an operator is informed that the operator selects the permission of the automatic DPF regeneration processing. For this reason, thermal damage to the DPF 1 that is caused when excessively accumulated PM is combusted rapidly and strongly when regenerating the DPF can be prevented.

(An Invention Relating to Claim 3)

The invention relating to claim 3 has the following effect in addition to the effect of the invention relating to claim 2.

<Effect> The integration time of a cancel state which is newly integrated after the execution of the automatic DPF regeneration processing is completed may be properly used as an index of a new PM accumulation estimation value.

When the execution of the automatic DPF regeneration processing is completed (S6) as shown in FIG. 2, the DPF regeneration control device 4 resets (S7) the cancel state integration time of the cancel state integration time computation device 17. Accordingly, the integration time of a cancel state whose role has been finished is lost, and the integration time of a cancel state which is newly integrated after the execution of the automatic DPF regeneration processing is completed may be properly used as an index of a new PM accumulation estimation value.

(An Invention Relating to Claim 4)

The invention relating to claim 4 has the following effect in addition to the effect of the invention relating to any one of claims 1 to 3.

<Effect> The automatic DPF regeneration processing can be performed based on an accurate PM accumulation estimation value with which the accumulation of PM in the cancel state is also integrated.

Even when the automatic DPF regeneration processing is executed and when the automatic DPF regeneration processing is in the cancel state, the DPF regeneration control device 4 integrates the PM accumulation estimation value of the DPF 1. Accordingly, even though the execution of the automatic DPF regeneration processing that was canceled is restarted or started as shown in FIG. 2, the automatic DPF regeneration processing may be performed based on an accurate PM accumulation estimation value with which the accumulation of PM in the cancel state is also integrated.

(An Invention Relating to Claim 5)

The invention relating to claim 5 has the following effect in addition to the effect of the invention relating to any one of claims 1 to 4.

<Effect> An error in the selection of the manipulation of the permission or prohibition of the automatic DPF regeneration processing can be prevented.

As shown in FIG. 3, when the execution of the automatic DPF regeneration processing is started (S3), the DPF regeneration control device 4 starts (S4) the notification of the execution of the automatic DPF regeneration processing through automatic regeneration notification device 52, and when the cancel processing for canceling the execution of the automatic DPF regeneration processing is started (S10), the DPF regeneration control device 4 starts (S11) the notification of the cancel state through a cancel state notification device 51. Accordingly, an operator may easily check the current state of the automatic DPF regeneration processing, and an error in the selection of the manipulation of the permission or prohibition of the automatic DPF regeneration processing can be prevented.

(An Invention Relating to Claim 6)

The invention relating to claim 6 has the following effect in addition to the effect of the invention relating to any one of claims 1 to 5.

<Effect> Thermal damage to the DPF when regenerating the DPF can be prevented.

As shown in FIG. 2, when the prohibition of the automatic DPF regeneration processing is selected through the automatic DPF regeneration processing permission or prohibition selection device 7, the DPF regeneration control device 4 starts (S24) automatic DPF regeneration processing permission selection recommendation notification through the automatic DPF regeneration processing permission selection recommendation notification device 55 based on the fact that the accumulation estimation value of the DPF 1 has reached an automatic DPF regeneration processing permission selection recommendation value J2 lower than the start value J3 of the automatic DPF regeneration processing. Accordingly, it is recommended that an operator select the permission of the automatic DPF regeneration processing before the accumulation estimation value of the DPF 1 reaches the start value J3 of the automatic DPF regeneration processing. Accordingly, PM can be prevented from being excessively accumulated on the DPF 1. For this reason, thermal damage to the DPF 1 that is caused when excessively accumulated PM is combusted rapidly and strongly when regenerating the DPF can be prevented.

(An Invention Relating to Claim 7)

The invention relating to claim 7 has the following effect in addition to the effect of the invention relating to any one of claims 1 to 6.

<Effect> PM can be incinerated and removed without problem even though the cancel state is long.

When the cancel state integration time of the automatic DPF regeneration processing exceeds a reset waiting time T4 as shown in FIG. 2, the DPF regeneration control device 4 resets (S16) the execution integration time of the automatic DPF regeneration processing. Accordingly, the execution integration time of the automatic DPF regeneration processing that was counted before the reset (S16) is not counted and is counted again while the automatic DPF regeneration processing is executed after the reset (S16). For this reason, even though PM is accumulated on the DPF during a long cancel state after the automatic DPF regeneration processing is executed, the PM can be incinerated and removed for a sufficient time through counting after the reset (S16). As a result, PM can be incinerated and removed without problem even though the cancel state is long.

(An Invention Relating to Claim 8)

The invention relating to claim 8 has the following effect in addition to the effect of the invention relating to any one of claims 1 to 7.

<Effect> PM can be incinerated and removed without problem even though the cancel state is long.

As shown in FIGS. 3 and 4, when the prohibition of the automatic DPF regeneration processing is selected through the automatic DPF regeneration processing permission or prohibition selection device 7, the DPF regeneration control device 4 starts (S13) (S24) automatic DPF regeneration processing permission selection recommendation notification through the automatic DPF regeneration processing permission selection recommendation notification device 55 based on the fact that an increase speed of the accumulation estimation value of PM accumulated on the DPF 1 has exceeded an automatic DPF regeneration processing permission selection recommendation speed V. Accordingly, it may be recommended that an operator select the permission of the automatic DPF regeneration processing before a large quantity of PM is accumulated on the DPF 1. For this reason, thermal damage to the DPF 1 that is caused when excessively accumulated PM is combusted rapidly and strongly when regenerating the DPF can be prevented.

(An Invention Relating to Claim 9)

The invention relating to claim 9 has the following effect in addition to the effect of the invention relating to any one of claims 1 to 8.

<Effect> An error in the manipulation of the selection of the permission or prohibition of the automatic DPF regeneration processing can be prevented.

As shown in FIG. 1, when the prohibition of the automatic DPF regeneration processing is selected through the automatic DPF regeneration processing permission or prohibition selection device 7, the DPF regeneration control device 4 informs that the prohibition of the automatic DPF regeneration processing has been selected through an automatic DPF regeneration processing prohibition selection notification device 53, and when the permission of the automatic DPF regeneration processing is selected through the automatic DPF regeneration processing permission or prohibition selection device 7, the DPF regeneration control device 4 informs that the permission of the automatic DPF regeneration processing has been selected through an automatic DPF regeneration processing permission selection notification device 54. Accordingly, since an operator can easily check a selection state, an error in the manipulation of the selection of the permission or prohibition of the automatic DPF regeneration processing can be prevented.

DESCRIPTION OF DRAWINGS

FIG. 4 is continuation of the flowchart of FIG. 3.

MODE FOR CARRYING OUT INVENTION

FIGS. 1 to 4 are diagrams illustrating an exhaust treatment device for a diesel engine relating to embodiments of the present invention. In the present embodiment, a common rail type multi-cylinder diesel engine equipped with the exhaust treatment device is described below.

Figure 1:
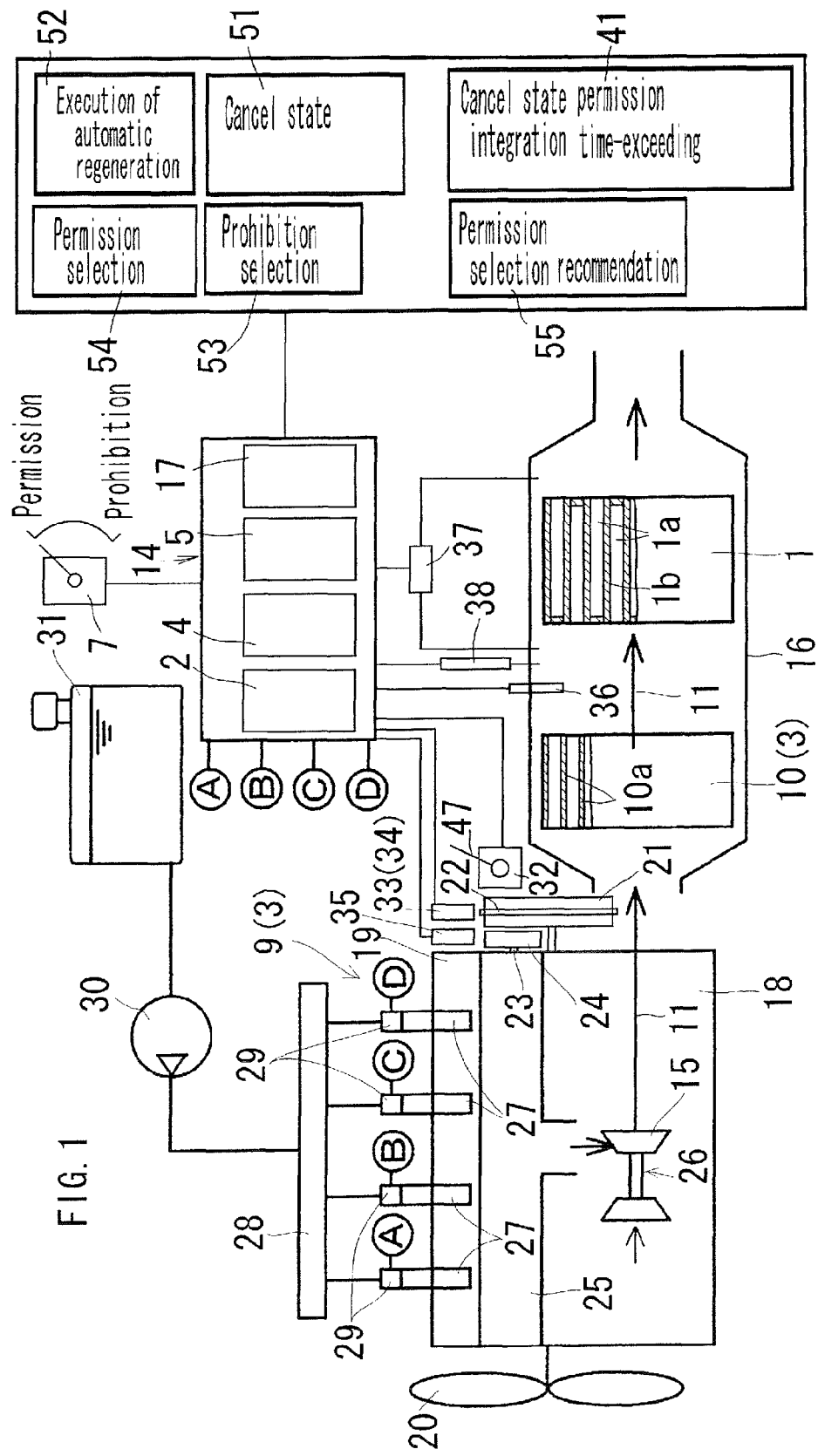
FIG. 1 is a diagram of an exhaust treatment device for a diesel engine related to an embodiment of the present invention.

An outline of the diesel engine shown in FIG. 1 is described below.

A cylinder head 19 is assembled over the cylinder block 18, an engine cooling fan 20 is disposed at the fore part of the cylinder block 18, a fly wheel 21 is disposed at the rear part of the cylinder block 18, and a rotor plate 22 is mounted on the fly wheel 21. Furthermore, a sensor plate 24 mounted on a valve-driven cam shaft 23 is disposed at the rear part of the cylinder block 18. An exhaust manifold 25 is disposed on one side of the cylinder head 19, and a supercharger 26 communicates with the exhaust manifold 25. A DPF accommodating casing 16 in which a DPF 1 is accommodated is disposed in the lower stream of the turbine 15 of the supercharger 26. A DOC 10 is also accommodated in the DPF accommodating casing 16. An injector 27 is disposed in the cylinder head 19 for each cylinder, and the injectors 27 are connected to a common rail 28. An electromagnetic valve 29 is installed in each of the injectors 27. A fuel tank 31 is connected to the common rail 28 through a fuel supply pump 30.

The target rotation number setting device 32 of the engine, the rotation number detection device 33 of the engine, the crank angle detection device 34, and a cylinder determination device 35 are associated with the electromagnetic valves 29 of the injectors 27 through an engine control device 14. The target rotation number setting device 32 of the engine is a potentiometer for outputting the target rotation number of the engine from the set position of a speed control lever 47 in the form of a voltage value. The rotation number detection device 33 and the crank angle detection device 34 of the engine are pick-up coils directed toward the outer circumference of the rotor plate 22, and they detect the number of rotations and the crank angle of the engine by detecting the number of teeth installed on the outer circumference of the rotor plate 22 at specific intervals. The cylinder determination device 35 is a sensor for determining that the combustion cycle of each cylinder is placed in what stroke by detecting protrusions installed in the sensor plate 24. The engine control device 14 is an engine ECU. The ECU is an abbreviation of an Electronic Control Unit.

The engine control device 14 controls the valve opening timing and the valve opening continuation time of the electromagnetic valve 29 of the injector 27 so that a deviation between the target rotation number of the engine and the number of rotations of the engine is small and performs the main injection of fuel having a specific amount from the injectors 27 to a combustion room on specific timing.

The exhaust treatment device is constructed as follows.

As shown in FIG. 1, the DPF 1, a PM accumulation amount estimation device 2 for estimating PM accumulated on the DPF 1, an automatic DPF regeneration device 3, a DPF regeneration control device 4, a memory device 5, a cancel integration time computation device 17, an automatic DPF regeneration processing permission or prohibition selection device 7, an automatic DPF regeneration processing permission selection notification device 54, an automatic DPF regeneration processing prohibition selection notification device 53, an automatic regeneration notification device 52, a cancel state notification device 51, an automatic DPF regeneration processing permission selection recommendation notification device 55, and a cancel integration time-exceeding notification device 41 are included.

The DPF 1 is a honeycomb carrier made of ceramics and is a wall-flow monolith in which the end parts of adjacent cells 1a are alternately blocked. An exhaust gas 11 passes through the inside of the cells 1a and the walls 1b of the cells 1a, and PM is captured by the walls 1b of the cells 1a.

The PM accumulation amount computation device 2 is a specific computation unit of the engine control device 14 and computes a PM accumulation estimation amount from experimentally obtained map data on the basis of an engine load, the number of rotations of the engine, temperature of the exhaust gas detected by a DPF upper stream-side exhaust temperature sensor 36, pressure of the exhaust gas on the DPF upper stream side detected by a DPF upper stream-side exhaust gas pressure sensor 38, and a differential pressure between the upper stream and lower stream of the DPF 1 detected by a differential pressure sensor 37.

The automatic DPF regeneration device 3 includes a combination of the common rail system 9 and the DOC 10 disposed in the upper stream of the DPF 1. The automatic DPF regeneration device 3 mixes unburnt fuel with the exhaust gas by post injection that is performed after the main injection from the injectors 27 of the common rail system 9 and oxidizes and incinerates the unburnt fuel by using oxygen within the exhaust gas by using the DOC 10, thereby raising temperature of the exhaust gas 11 that passes through the DPF 1.

The DOC 10 is a honeycomb carrier made of ceramics, and it has a flow-through structure in which an oxidation catalyst is received and both ends of a cell 10a are opened. The exhaust gas 11 passes through the inside of the cells 10a.

The automatic DPF regeneration device 3 may include a combination of the injectors for injecting fuel into the exhaust pipe and the DOC 10, and may include an electric heater disposed at the entrance of the DPF 1.

The DPF regeneration control device 4 is installed in the engine control device 14. The memory device 5 is memory installed in the engine control device 14. All the value of the execution integration time of the automatic DPF regeneration processing, the value of the cancel integration time computed by the cancel integration time computation device 17, and the PM accumulation estimation value are stored in the memory device 5, and the values keep stored while the engine is stopped. The automatic DPF regeneration processing permission or prohibition selection device 7 is a switching lever and is configured to select the permission or prohibition of the automatic DPF regeneration processing.

Both the PM accumulation amount computation device 2 and the cancel integration time computation device 17 are the computation units of the engine control device 14.

All the automatic DPF regeneration processing permission selection notification device 54, the automatic DPF regeneration processing prohibition selection notification device 53, the automatic regeneration notification device 52, the cancel state notification device 51, the automatic DPF regeneration processing permission selection recommendation notification device 55, and the cancel integration time-exceeding notification device 41 are electric light display units disposed in the display panel of the dash board of a machine on which the engine is mounted.

As shown in FIG. 1, the DPF regeneration control device 4 starts the execution of the automatic DPF regeneration processing (S3) based on the fact that the estimation value of PM accumulated on the DPF 1 has reached the start value J3 of the automatic DPF regeneration processing. Accordingly, the PM accumulated on the DPF 1 is incinerated and removed by the heat of the exhaust gas 11 because temperature of the exhaust gas 11 that passes through the DPF 1 is raised by the automatic DPF regeneration device 3. Furthermore, the DPF regeneration control device 4 may start cancel processing for canceling the execution of the automatic DPF regeneration processing (S10) based on the manipulation of the prohibition of the automatic DPF regeneration processing even though the DPF 1 satisfies a condition that the automatic DPF regeneration processing is executed.

In the present embodiment, the automatic DPF regeneration processing is executed from the time when the estimation value of PM accumulated on the DPF 1 reaches the start value J3 of the automatic DPF regeneration processing and thus the execution of the automatic DPF regeneration processing is started (S3) to the time when the execution integration time of the automatic DPF regeneration processing reaches an automatic DPF regeneration processing completion time T5. This is a condition that the automatic DPF regeneration processing is executed.

While the automatic DPF regeneration processing is executed, temperature of the exhaust gas 11 is raised and PM accumulated on the DPF 1 is incinerated and removed by the exhaust gas 11.

In the present embodiment, the cancel processing for canceling the execution of the automatic DPF regeneration processing refers to processing in which the DPF regeneration control device 4 cancels the automatic DPF regeneration processing because the prohibition of the automatic DPF regeneration processing has been selected although the DPF 1 satisfies the condition that the automatic DPF regeneration processing is executed.

For this reason, cancel processing is started (S10) in the following cases.

Figure 2:
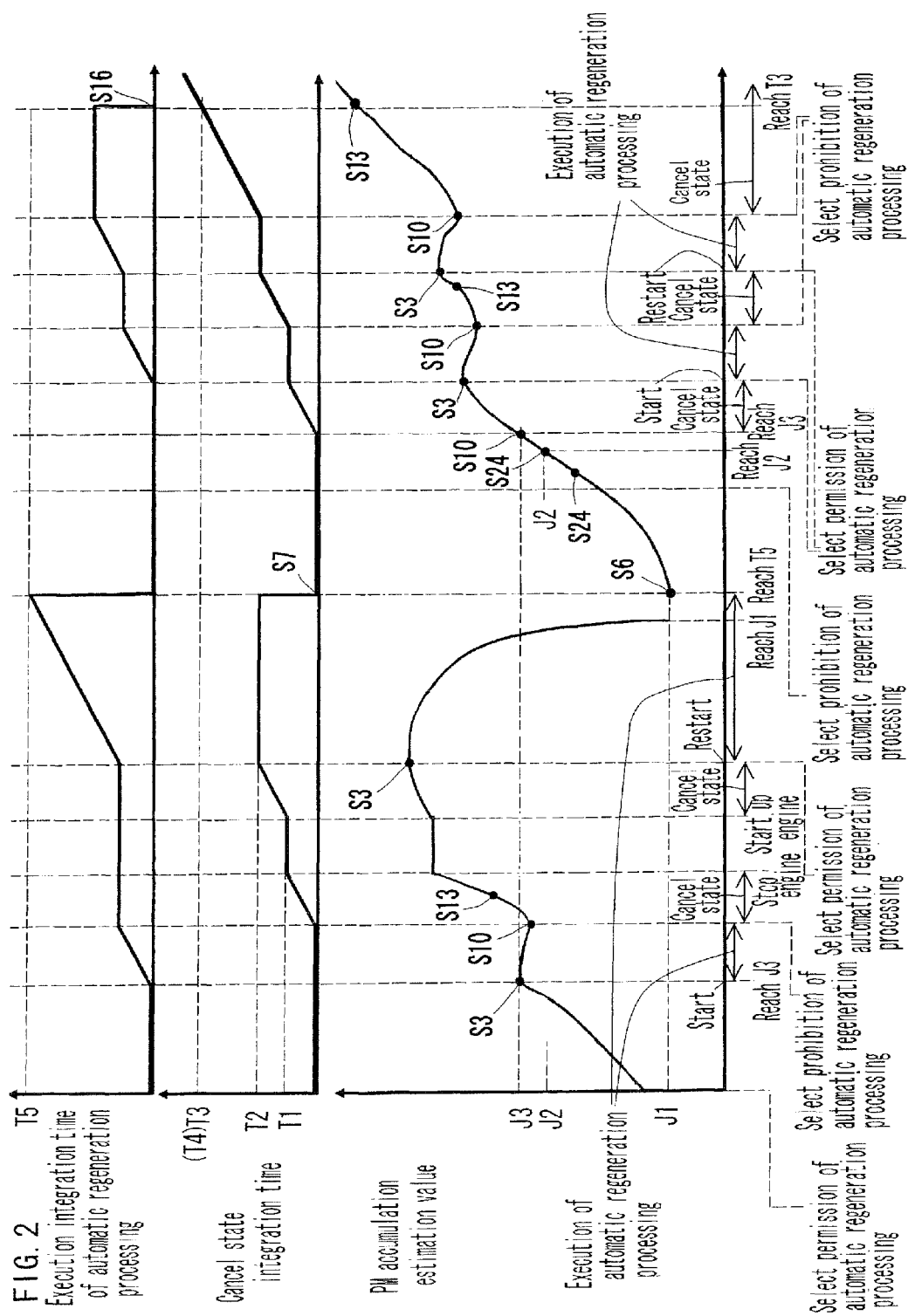
FIG. 2 is a time chart of control by a DPF regeneration control device used in the exhaust treatment device of FIG. 1.

That is, as shown in the graph on the left side of FIG. 2, when the permission of the automatic DPF regeneration processing is selected, a PM accumulation estimation value reaches the start value J3 of the automatic DPF regeneration processing, and thus the execution of the automatic DPF regeneration processing is started (S3), the cancel processing is started (S10) if the prohibition of the automatic DPF regeneration processing is selected before the execution integration time of the automatic DPF regeneration processing reaches the automatic DPF regeneration processing completion time T5.

Furthermore, as shown in the graph on the right side of FIG. 2, the cancel processing is also started (S10) when the PM accumulation estimation value reaches the start value J3 of the automatic DPF regeneration processing after the prohibition of the automatic DPF regeneration processing is selected.

Furthermore, as shown in the graph on the right side of FIG. 2, the cancel processing is also started (S10) when the prohibition of the automatic DPF regeneration processing is selected before the execution integration time of the automatic DPF regeneration processing reaches the automatic DPF regeneration processing completion time T5 after the permission of the automatic DPF regeneration processing is selected after a cancel state and thus the execution of the automatic DPF regeneration processing is started (S3).

The cancellation of the automatic DPF regeneration processing is used when a machine on which the engine is mounted is used in environments in which regulation of an exhaust gas is strictly applied, such as the interior of a room and a park, in order to maintain the exhaust gas in a clearer and low-temperature state.

When the automatic DPF regeneration processing permission or prohibition selection device 7 is installed as shown in FIG. 1 and the prohibition of the automatic DPF regeneration processing is selected through the automatic DPF regeneration processing permission or prohibition selection device 7 as shown in FIG. 2, the DPF regeneration control device 4 starts (S10) the cancel processing for canceling the execution of the automatic DPF regeneration processing.

When the permission of the automatic DPF regeneration processing is selected through the automatic DPF regeneration processing permission or prohibition selection device 7 as shown in FIG. 2, the DPF regeneration control device 4 releases the cancel state of the automatic DPF regeneration processing so that the execution of the automatic DPF regeneration processing that was cancelled is started (S3).

When the cancel state integration time computation device 17 for computing an integration time when the automatic DPF regeneration processing is in the cancel state and the cancel state permission integration time-exceeding notification device 41 are included as shown in FIG. 1 and the integration time when the automatic DPF regeneration processing is in the cancel state exceeds the cancel state permission integration time T3 as shown in FIG. 2, the DPF regeneration control device 4 starts the cancel state permission integration time-exceeding notification (S15) through the cancel state permission integration time-exceeding notification device 41.

When the execution of the automatic DPF regeneration processing is completed (S6) as shown in FIG. 2, the DPF regeneration control device 4 resets (S7) the cancel state integration time of the cancel state integration time computation device 17.

Even when the automatic DPF regeneration processing is executed and when the automatic DPF regeneration processing is in the cancel state, the DPF regeneration control device 4 integrates the PM accumulation estimation value of the DPF 1.

Figure 3:
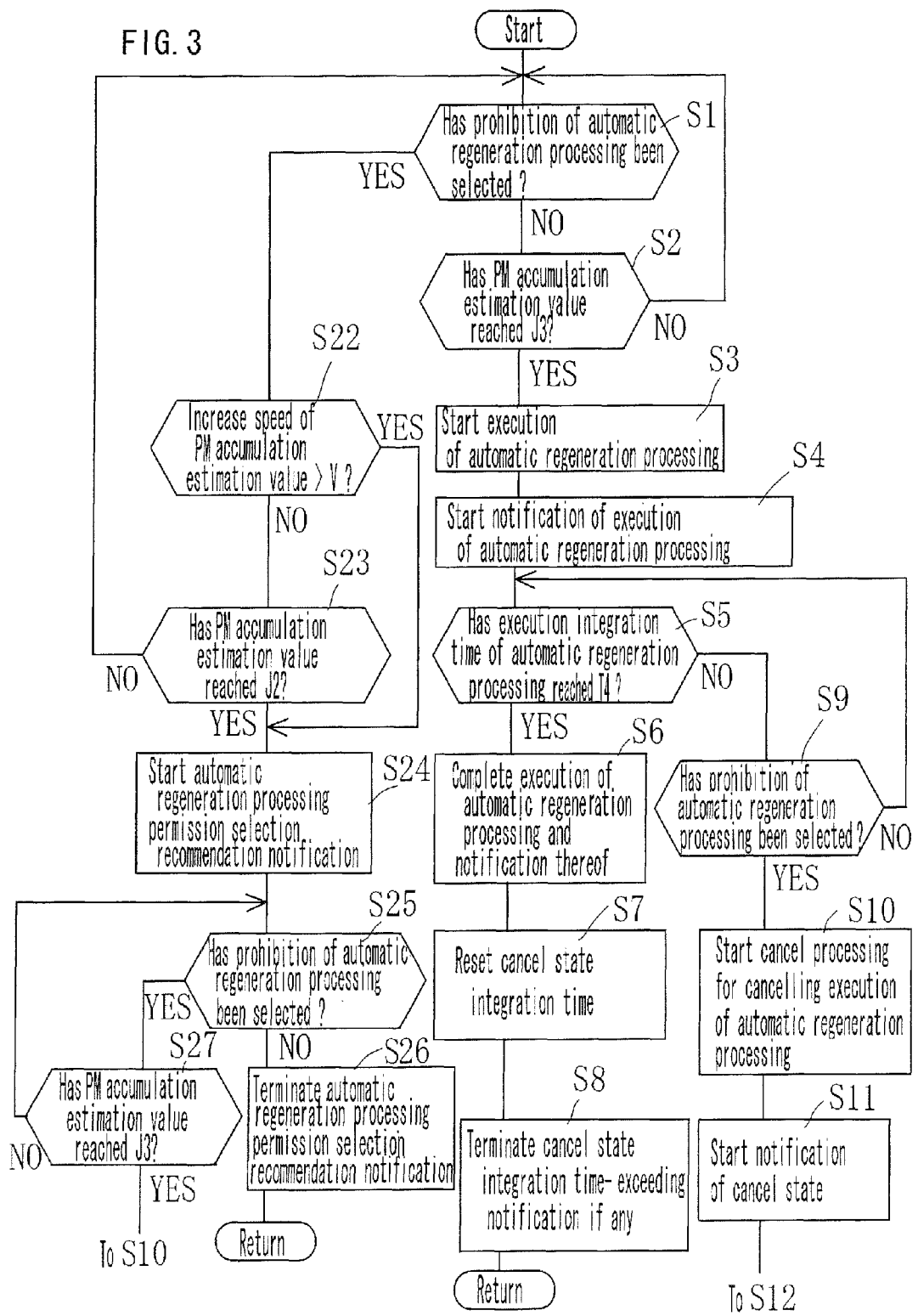
FIG. 3 is a part of a flowchart of control by the DPF regeneration control device used in the exhaust treatment device of FIG. 1.

When the execution of the automatic DPF regeneration processing is started (S3) as shown in FIG. 3, the DPF regeneration control device 4 starts the notification of the execution of the automatic DPF regeneration processing (S4) through the automatic regeneration notification device 52. When the cancel processing for canceling the execution of the automatic DPF regeneration processing is started (S10), the DPF regeneration control device 4 starts (S11) the notification of the cancel state through the cancel state notification device 51.

When the prohibition of the automatic DPF regeneration processing is selected through the automatic DPF regeneration processing permission or prohibition selection device 7 as shown in FIG. 2, the DPF regeneration control device 4 starts (S24) the permission selection recommendation notification of the automatic DPF regeneration processing through the automatic DPF regeneration processing permission selection recommendation notification device 55 based on the fact that the accumulation estimation value of the DPF 1 has reached the automatic DPF regeneration processing permission selection recommendation value J2 lower than the start value J3 of the automatic DPF regeneration processing.

As shown in FIG. 2, based on the fact that the execution of the automatic DPF regeneration processing is started (S3) and then the execution integration time of the automatic DPF regeneration processing has reached the automatic DPF regeneration processing completion time T5, the DPF regeneration control device 4 performs control as follows when the automatic DPF regeneration device 3 completes (S6) the execution of the automatic DPF regeneration processing.

When the cancel state integration time computation device 17 for computing an integration time when the automatic DPF regeneration processing is in the cancel state is installed as shown in FIG. 1 and the integration time when the automatic DPF regeneration processing is in the cancel state exceeds a reset waiting time T4 as shown in FIG. 2, the DPF regeneration control device 4 resets (S11) the execution integration time of the automatic DPF regeneration processing.

In the present embodiment, the reset waiting time T4 is illustrated as being the same value as the cancel state permission integration time T3, but may be a value different from the cancel state permission integration time T3, for example, a value lower than the cancel state permission integration time T3.

When the automatic DPF regeneration processing permission selection recommendation notification device 55 is installed as shown in FIG. 1 and the prohibition of the automatic DPF regeneration processing is selected through the automatic DPF regeneration processing permission or prohibition selection device 7 as shown in FIGS. 3 and 4, the DPF regeneration control device 4 starts (S13) (S24) the automatic DPF regeneration permission selection recommendation notification through the automatic DPF regeneration processing permission selection recommendation notification device 55 based on the fact that the speed that the estimation value of PM accumulated on the DPF 1 increases has exceeded an automatic DPF regeneration processing permission selection recommendation speed V.

When the prohibition of the automatic DPF regeneration processing is selected through the automatic DPF regeneration processing permission or prohibition selection device 7 as shown in FIG. 1, the DPF regeneration control device 4 informs that the prohibition of the automatic DPF regeneration processing has been selected through the automatic DPF regeneration processing prohibition selection notification device 53. When the permission of the automatic DPF regeneration processing is selected through the automatic DPF regeneration processing permission or prohibition selection device 7, the DPF regeneration control device 4 informs that the permission of the automatic DPF regeneration processing has been selected through the automatic DPF regeneration processing permission selection notification device 54.

A flow of control by the DPF regeneration control device 4 is as follows.

As shown in FIG. 3, whether the prohibition of the automatic DPF regeneration processing has been selected or not is determined at step S1. If, a result of the determination is NO, that is, the permission of the automatic DPF regeneration processing has been selected, whether a PM accumulation estimation value has reached the start value J3 of the automatic DPF regeneration processing or not is determined at step S2.

If a result of the determination at step S2 is NO, the process returns to the step S1. If a result of the determination at step S2 is YES, the execution of the automatic DPF regeneration processing is started at step S3, the notification of the execution of the automatic regeneration processing is started at step S4, and then whether the execution integration time of the automatic DPF regeneration processing has reached the automatic DPF regeneration processing completion time T5 or not is determined at step S5.

If a result of the determination at step S5 is YES, the execution of the automatic regeneration processing and the notification thereof are completed at step S6, the cancel state integration time is reset at step S7, a cancel state integration time-exceeding notification is terminated if there is a cancel state integration time-exceeding notification at step S8, and then the process returns to the step S1.

If a result of the determination at step S5 is NO, whether the prohibition of the automatic regeneration processing has selected or not is determined at step S9. If a result of the determination is NO, the process returns to the step S5. If a result of the determination is YES, the cancel processing for canceling the execution of the automatic DPF regeneration processing is started, the notification of the cancel state is started at step S11, and then the process proceeds to the step S12.

At step S12, whether the increase speed of the PM accumulation estimation value has exceeded a permission selection recommendation speed V or not is determined. If a result of the determination is YES, the automatic regeneration processing permission selection recommendation notification is started at step S13, and whether the cancel state integration time has exceeded the cancel state permission integration time T3 and the reset waiting time T4 or not is determined at step S14. If a result of the determination at step S12 is NO, the step S13 is skipped and the process proceeds to step the S14.

If a result of the determination at step S14 is YES, the cancel state integration time-exceeding notification is started at step S15, the execution integration time of the automatic DPF regeneration processing is reset at step S16, and whether the prohibition of the automatic DPF regeneration processing has been selected or not is determined at step S17.

The step S17 is repeated until the determination is NO. If a result of the determination at step S17 is NO, an automatic DPF regeneration processing permission selection recommendation notification is terminated at step S18 when there is the automatic DPF regeneration processing permission selection recommendation notification, the cancel processing for canceling the execution of the automatic DPF regeneration processing is terminated at step S19, the notification of the cancel state is terminated at step S20, and then process returns to the step S3.

If a result of the determination at step S14 is NO, whether the prohibition of the automatic regeneration processing has been selected or not is determined at step S21. If a result of the determination is NO, the process proceeds to the step S18. If a result of the determination at step S21 is YES, the process returns to the step S14.

If a result of the determination at step S1 is YES, that is, the prohibition of the automatic DPF regeneration processing has been selected, whether the increase speed of the PM accumulation estimation value has exceeded the permission selection recommendation speed V or not is determined at step S22. If a result of the determination is NO, whether the PM accumulation estimation value of the DPF 1 has reached the automatic DPF regeneration processing permission selection recommendation value J2 lower than the start value J3 of the automatic DPF regeneration processing or not is determined at step S23. If a result of the determination is YES, the process proceeds to the step S24. If a result of the determination at step S23 is NO, the process returns to the step S1. If a result of the determination at step S22 is YES, the step S23 is skipped and the process proceeds to the step S24.

The automatic regeneration processing permission selection recommendation notification is started at step S24, and whether the prohibition of the automatic DPF regeneration processing has been selected or not is determined at step S25. If a result of the determination is NO, the automatic regeneration processing permission selection recommendation notification is terminated at step S26, and the process returns to the step S1. If a result of the determination at step S25 is YES, whether the PM accumulation estimation value has reached the start value J3 of the automatic DPF regeneration processing or not is determined at step S27. If a result of the determination is YES, the process proceeds to the step S10. If a result of the determination at step S27 is NO, the process returns to the step S25.

A detailed example of control by the DPF regeneration control device 4 is as follows.

As shown in the graph on the left side of FIG. 2, if the permission of the automatic DPF regeneration processing has been selected, when the PM accumulation estimation value of the DPF 1 reaches the start value J3 of the automatic DPF regeneration processing, the automatic DPF regeneration processing is started (S), and the execution integration time of the automatic DPF regeneration processing starts being integrated. Next, when the prohibition of the automatic DPF regeneration processing is selected, the automatic DPF regeneration processing shifts to a cancel state, and a cancel integration time is integrated. If the automatic DPF regeneration prohibition has been selected, when the increase speed of a PM accumulation estimation value exceeds the automatic DPF regeneration processing permission selection recommendation speed V, the automatic DPF regeneration permission selection recommendation notification is started (S13).

Next, when the engine is stopped, the cancel integration time T1 remains stored in the memory device 5. Thereafter, when the engine is started up, a new cancel time T2 is integrated with the cancel integration time T1. Thereafter, when the permission of the automatic DPF regeneration processing is selected, the cancel state is released and the automatic DPF regeneration processing is started. The cancel integration time T2 at this time remains stored in the memory device 5.

Thereafter, when the execution integration time of the automatic DPF regeneration processing reaches the automatic DPF regeneration processing completion time T5, the automatic DPF regeneration processing is terminated (S6). In this case, the cancel integration time T2 that remains stored in the memory device 5 is reset to 0 (S7). At a point of time at which the automatic DPF regeneration processing is terminated (S6), the PM accumulation estimation value of the DPF 1 has dropped to an end value J1 close to 0.

As shown in the graph on the right side of FIG. 2, when the prohibition of the automatic DPF regeneration processing is selected and the PM accumulation estimation value reaches the automatic DPF regeneration processing permission selection recommendation value J2, the automatic DPF regeneration processing permission selection recommendation notification is started (S24). When the PM accumulation estimation value reaches the start value J3 of the automatic DPF regeneration processing, the cancel processing is started (S10). When the permission of the automatic DPF regeneration processing is selected, the automatic DPF regeneration processing is started (S3). Thereafter, when the prohibition of the automatic DPF regeneration processing is selected, the cancel processing is started (S10). If the automatic DPF regeneration prohibition has been selected, when the increase speed of the PM accumulation estimation value exceeds the automatic DPF regeneration processing permission selection recommendation speed V, the automatic DPF regeneration permission selection recommendation notification is started (S13).

Thereafter, when the permission of the automatic DPF regeneration processing is selected, the automatic DPF regeneration processing is started (S3). Thereafter, when the prohibition of the automatic DPF regeneration processing is selected, the cancel processing is started (S8). In the case of a cancel state, a cancel integration time is integrated. When the automatic DPF regeneration processing is executed, the execution time of the automatic DPF regeneration processing is integrated. Furthermore, when the cancel time integration time exceeds the cancel state permission integration time T3 and the reset waiting time T4, the cancel state permission integration time-exceeding notification is started (S15) and the execution integration time of the automatic DPF regeneration processing is reset to 0 (S16).

Furthermore, the automatic DPF regeneration processing is not in the state where it should be started until the PM accumulation estimation value of the DPF 1 reaches the start value J3 of the automatic DPF regeneration processing. Accordingly, even though the prohibition of the automatic DPF regeneration processing has been selected, the cancel processing for canceling the execution of the automatic DPF regeneration processing is not started, and the computation of the cancel state integration time is not started, either. Thereafter, when the PM accumulation estimation value of the DPF 1 reaches the start value J3 of the automatic DPF regeneration processing, the automatic DPF regeneration processing becomes the state where it has to be executed. Thus, the execution of the automatic DPF regeneration processing becomes a cancel state based on the prohibition of the automatic DPF regeneration processing that was previously selected, and thus the cancel integration time is computed.

DESCRIPTION OF REFERENCE NUMERALS

1 DPF
3 Automatic DPF regeneration device
4 DPF regeneration control device
7 Automatic DPF regeneration processing permission or prohibition selection device
11 Exhaust gas
17 Cancel integration time computation device
41 Cancel state permission integration time-exceeding notification device
51 Cancel state notification device
52 Automatic regeneration notification device
54 Automatic DPF regeneration processing permission selection notification device
55 Automatic DPF regeneration processing permission selection recommendation notification device
J2 Automatic DPF regeneration processing permission selection recommendation value
J3 Start value of automatic DPF regeneration processing
V Automatic DPF regeneration processing permission selection recommendation speed
T1 Cancel integration time
T2 Cancel integration time
T3 Cancel state permission integration time
T4 Reset waiting time
T5 Automatic DPF regeneration processing completion time
S3 Start execution of automatic DPF regeneration processing
S4 Start notification of execution of automatic DPF regeneration processing
S6 Complete execution of automatic DPF regeneration processing
S7 Reset cancel state integration time
S10 Start cancel processing
S11 Start notification of cancel state
S13 Start automatic DPF regeneration permission selection recommendation notification
S15 Start cancel state permission integration time-exceeding notification
S16 Reset execution integration time of automatic DPF regeneration processing
S24 Start automatic DPF regeneration processing permission selection recommendation notification

The invention claimed is:

1. An exhaust treatment device for a diesel engine comprising a diesel particulate filter (DPF) regeneration control device (4), an automatic DPF regeneration device 3 an automatic DPF regeneration processing permission or prohibition selection device (7), and a cancel state integration time computation device (17), wherein the automatic DPF regeneration processing permission or prohibition selection device (7) is configured to select permission or prohibition of an automatic DPF regeneration processing via a manual switching operation by an operator, wherein the cancel state integration time computation device (17) is configured to compute a cancel state integration time of the automatic DPF regeneration processing, and wherein the DPF regeneration control device (4) is configured to:

(I) start (S3) an execution of the automatic DPF regeneration processing once an accumulation estimation value of particulate material (PM) accumulated on a DPF (1) reaches a start value (J3) of the automatic DPF regeneration processing whereby the automatic DPF regeneration device (3) raises a temperature of an exhaust gas (11) passing, through the DPF (1) and thus the PM gathered at the DPF (1) is incinerated and removed by heat of the exhaust gas (11);

(II) complete (S6) the execution of the automatic DPF regeneration processing through the automatic DPF regeneration device (3) once an execution integration time of the automatic DPF regeneration processing reaches an automatic DPF regeneration processing completion time (T5) after the execution of the automatic DPF regeneration processing is started (S3);

(III) start cancel processing for canceling the execution of the automatic DPF regeneration processing based on a manipulation of prohibition of the automatic DPF regeneration processing although the DPF (1) satisfies a condition that the automatic DPF regeneration processing is executed;

(IV) start (S10) the cancel processing for canceling the execution of the automatic DPF regeneration processing, when prohibition of the automatic DPF regeneration processing is manually selected by the operator via the automatic DPF regeneration processing permission or prohibition selection device (7);

(V) release a cancel state of the automatic DPF regeneration processing so that the execution of the automatic DPF regeneration processing that was canceled is started (S3), when the permission of the automatic DPF regeneration processing is manually selected through by the operator via the automatic DPF regeneration processing permission or prohibition selection device (7); and (VI) reset (S16) the execution integration time of the automatic DPF regeneration processing once the cancel state integration time of the automatic DPF regeneration processing exceeds a reset waiting time (T4).

2. The exhaust treatment device of claim 1, further comprising:

a cancel state permission integration time-exceeding notification device (41), wherein when the cancel state integration time of the automatic DPF regeneration processing exceeds a cancel state permission integration time (T3), the DPF regeneration control device (4) starts (S15) a cancel state permission integration time-exceeding notification through a cancel state permission integration time-exceeding notification device (41).

3. The exhaust treatment device of claim 2, wherein when the execution of the automatic DPF regeneration processing is completed (S6), the DPF regeneration control device (4) resets (S7) the cancel state integration time of the cancel state integration time computation device (17).

4. The exhaust treatment device of claim 1, wherein when the automatic DPF regeneration processing is executed and when the automatic DPF regeneration processing is in the cancel state, the DPF regeneration control device (4) integrates the PM accumulation estimation value of the DPF (1).

5. The exhaust treatment device of claim 1, wherein:

when the execution of the automatic DPF regeneration processing is started (S3), the DPF regeneration control device (4) starts (S4) the notification of the execution of the automatic DPF regeneration processing through an automatic regeneration notification device (52), and when the cancel processing for canceling the execution of the automatic DPF regeneration processing is started (S10), the DPF regeneration control device (4) starts (S11) the notification of the cancel state through a cancel state notification device (51).

6. The exhaust treatment device of claim 1, further comprising an automatic DPF regeneration processing permission selection recommendation notification device (55), and when the prohibition of the automatic DPF regeneration processing is selected through the automatic DPF regeneration processing permission or prohibition selection device (7), the DPF regeneration control device (4) starts (S24) automatic DPF regeneration processing permission selection recommendation notification through the automatic DPF regeneration processing permission selection recommendation notification device (55) based on the accumulation estimation value of the DPF (1) reaching an automatic DPF regeneration processing permission selection recommendation value (J2) lower than the start value (J3) of the automatic DPF regeneration processing.

7. The exhaust treatment device of claim 1, further comprising an automatic DPF regeneration processing permission selection recommendation notification device (55), and when the prohibition of the automatic DPF regeneration processing is selected through the automatic DPF regeneration processing permission or prohibition selection device (7), the DPF regeneration control device (4) starts (S13) (S24) automatic DPF regeneration processing permission selection recommendation notification through the automatic DPF regeneration processing permission selection recommendation notification device (55) based on an increase speed of the accumulation estimation value of PM accumulated on the DPF (1) exceeding an automatic DPF regeneration processing permission selection recommendation speed (V).

8. The exhaust treatment device of claim 1, wherein:
when the prohibition of the automatic DPF regeneration processing is selected through the automatic DPF regeneration processing permission or prohibition selection device (7), the DPF regeneration control device (4) informs the operator that the prohibition of the automatic DPF regeneration processing has been selected through automatic DPF regeneration processing prohibition selection notification device (53), and when the permission of the automatic DPF regeneration processing is selected through the automatic DPF regeneration processing permission or prohibition selection device (7), the DPF regeneration control device (4) informs the operator that the permission of the automatic DPF regeneration processing has been selected through an automatic DPF regeneration processing permission selection notification device (54).

* * * * *